United States Patent [19]

Barclay et al.

[11] Patent Number: 4,642,994
[45] Date of Patent: Feb. 17, 1987

[54] MAGNETIC REFRIGERATION APPARATUS WITH HEAT PIPES

[75] Inventors: John A. Barclay, Los Alamos, N. Mex.; F. Coyne Prenger, Jr., Madison, Wis.

[73] Assignee: The United States of America as represented by the United States Department of Energy, Washington, D.C.

[21] Appl. No.: 791,280

[22] Filed: Oct. 25, 1985

[51] Int. Cl.$^4$ ............................................. F25B 21/02
[52] U.S. Cl. .................................................. 62/3; 62/6
[58] Field of Search ............................................. 62/3, 6

[56] References Cited

U.S. PATENT DOCUMENTS

| | | |
|---|---|---|
| 428,057 | 5/1890 | Tesla . |
| 2,510,800 | 6/1950 | Chilowsky . |
| 2,589,775 | 3/1952 | Chilowsky . |
| 2,619,603 | 11/1952 | Chilowsky . |
| 3,108,444 | 10/1963 | Kahn ........................................ 62/3 |
| 3,154,927 | 11/1964 | Simon ....................................... 62/3 |
| 3,393,526 | 7/1968 | Pearl ......................................... 62/3 |
| 3,413,814 | 12/1968 | van Geuns ................................ 62/3 |
| 3,743,866 | 7/1973 | Pirc ........................................ 310/4 |
| 3,774,404 | 11/1973 | Walker et al. ............................ 62/3 |
| 3,841,107 | 10/1974 | Clark ........................................ 62/3 |
| 4,033,734 | 7/1977 | Steyert et al. ............................. 62/3 |
| 4,069,028 | 1/1978 | Brown ....................................... 62/3 |
| 4,107,935 | 8/1978 | Steyert ...................................... 62/3 |
| 4,136,525 | 1/1979 | Van Vechten ............................. 62/3 |
| 4,332,135 | 6/1982 | Barclay et al. ............................ 62/3 |
| 4,408,463 | 10/1983 | Barclay .................................... 62/3 |
| 4,429,539 | 2/1984 | Leach ....................................... 62/6 |
| 4,457,135 | 7/1984 | Hakuraku et al. ........................ 62/3 |
| 4,459,811 | 7/1984 | Barclay et al. ............................ 62/3 |
| 4,464,903 | 8/1984 | Nakagome et al. ....................... 62/3 |
| 4,507,927 | 4/1985 | Barclay .................................... 62/3 |
| 4,507,928 | 4/1985 | Johnson ................................... 62/3 |
| 4,509,334 | 4/1985 | Nakagome et al. ....................... 62/3 |

OTHER PUBLICATIONS

T. Numazawa et al., "The Magnetic Refrigeration Characteristics of Several Magnetic Refrigerants Below 20 K: II Thermal Properties," Proceedings of CEC, San Diego, California (1981).

H. Nakagome et al., "The Helium Magnetic Refrigerator I—Development and Experimental Results—," Proceedings of CEC and CMC: FC-10, Colorado Springs, Colo. (1983).

A. F. Lacaze et al., "A Gadolinium Gallium Garnet Double Acting Reciprocating Magnetic Refrigerator," CEC 81, San Diego, California, Paper HB 6, pp. 1-8.

T. Numazawa et al., "The Helium Magnetic Refrigerator II: Precise Experimental Results and Further Study," Proceedings of CEC and CMC: FC-11, Colorado Springs, Colo. (1983).

C. Delpuech et al., "Double Acting Reciprocating Magnetic Refrigerator: First Experiments," Cryogenics, 579-584 (Oct. 1981).

G. V. Brown, "Magnetic Heat Pumping Near Room Temperature," J. Appl. Phys. 47, No. 8, 3673-3680 (1976).

J. A. Barclay, "An Analysis of Liquefaction of Helium Using Magnetic Refrigerators," Los Alamos National Laboratory report LA-8991 (Dec. 1981).

List Continued on next page.

*Primary Examiner*—Lloyd L. King
*Attorney, Agent, or Firm*—Joseph M. Hageman; Ray G. Wilson; Judson R. Hightower

[57] ABSTRACT

A magnetic refrigerator operating in the 4 to 20 K range utilizes heat pipes to transfer heat to and from the magnetic material at the appropriate points during the material's movement. In one embodiment circular disks of magnetic material can be interleaved with the ends of the heat pipes. In another embodiment a mass of magnetic material reciprocatingly moves between the end of the heat pipe of pipes that transmits heat from the object of cooling to the magnetic material and the end of the heat pipe or pipes that transmits heat from the magnetic material to a heat sink.

23 Claims, 6 Drawing Figures

OTHER PUBLICATIONS

J. A. Barclay et al., "A Reciprocating Magnetic Refrigerator for 2-4 K Operation: Initial Results," J. Appl. Phys. 50, No. 9, 5870-5877 (1979).

J. A. Barclay et al., "Materials for Magnetic Refrigeration Between 2 K and 20 K," Cryogenics, 73-80 (Feb. 1982).

J. A. Barclay et al., "Magnetic Refrigeration for Space Applications, Report on a Design Study," Los Alamos Scientific Laboratory Report LA-8134 (Feb. 1980).

J. A. Barclay, "Use of a Ferrofluid as the Heat-Exchange Fluid in a Magnetic Refrigerator," J. Appl. Phys. 53, No. 4, 2887-2894 (1982).

J. R. van Geuns, "A Study of a New Magnetic Refrigerating Cycle," N. V. Philips Research Report, Gloeilampenfabrieken, Eindhoven, Netherlands (Jun. 1966).

J. A. Barclay, "Magnetic Refrigeration for Spacecraft Systems," Amer. Soc. Mech. Eng., Intersociety Conf. on Environmental Systems, San Francisco, California, Jul. 13-15, 1981 (ASME Publication 81-ENAs-47), pp. 1-7.

A. F. Lacaze et al., "Thermodynamical Analysis of a Double Acting Reciprocating Magnetic Refrigerator," Proceedings of CEC, San Diego, Calif. (1981).

J. A. Barclay, "Can Magnetic Refrigerators Liquefy Hydrogen at High Efficiency?" 20th Joint ASME/AlChE National Heat Transfer Conference, Milwaukee, Wisconsin, Aug. 2-5, 1981 (ASME Publication 81-HI-82), pp. 1-8.

M. Shiino, "Analysis of Regenerative Operations in Magnetic Refrigeration," Proceedings of CEC, San Diego, Calif. (1981).

A. F. Lacaze et al., "Theromodynamical Analysis of a Double Acting Reciprocating Magnetic Refrigerator," Proc. of ICEO-9, Kobe, Japan, May 1982 (Butterworth, Guilford 1983).

T. Hashimoto et al., "A New Usage of Anisotropic Magnetic Compound for the Magnetic Refrigerant," Proceedings of CEC, San Diego, Calif. (1981).

A. F. Lacaze et al., "Double Acting Reciprocating Magnetic Refrigerator: Recent Improvements," Adv. Cryog. Eng. 29, 573 (1984).

T. Hashimoto et al., "The Magnetic Refrigeration Characteristics of Several Magnetic Refrigerants Below 20 K: I Magnetocaloric Effect," Proceedings of CEC, San Diego, Calif. (1981).

A. F. Lacaze et al., "Efficiency Improvements of a Double Acting Reciprocating Magnetic Refrigerator," Cryogenics, 427-432 (Aug. 1983).

Takasu Hashimoto et al., "The Carnot Type Magnetic Refrigeration Below 4.2 K: Computer Simulation," Physica 108B, 1105 (1981).

J. A. Barclay, "A Comparison of the Efficiency of Gas and Magnetic Refrigerators," Los Alamos National Laboratory report LA-UR-84-0212 (1984).

MAGNETIC REFRIGERATION APPARATUS WITH HEAT PIPES

This invention is the result of a contract with the Department of Energy (Contract No. W-7405-ENG-36).

BACKGROUND OF THE INVENTION

This invention relates to magnetic refrigeration and more particularly to low temperature refrigeration between 4 and about 20 K. with an apparatus utilizing heat pipes to transmit heat to and from the magnetic material.

Magnetic refrigerators such as diclosed in U.S. Pat. Nos. 4,459,811 and 4,332,135 both issued to Barclay et al., and U.S. Pat. Nos. 4,408,463 and 4,507,927 both issued to Barclay are known and the four patents are specifically incorporated herein by reference. Such magnetic refrigerators utilized paramagnetic or ferromagnetic material and moved the material in and out of the magnetic field, or by some other means, caused the material to magnetize and demagnetize. Many such magnetic refrigeration devices are operable over wide temperature ranges by staging a plurality of materials listed in the '135 patent. However, all such proposed magnetic refrigerator apparatus depended upon the flow of a fluid to transfer heat from the magnetic material to a heat sink or heat load. This flowing fluid required elaborate seals and pumping mechanisms to insure proper transfer of heat in the desired direction.

U.S. Pat. No. 4,464,903 issued to Nakagome, et al. disclosed directional heat pipes disposed in a stationary mass of magnetic material and emerging from both top and bottom surfaces. A magnet moved closer to and away from the magnetic mass to vary the magnetic field. However due to the thermal addenda resulting from this arrangement of parts and the use of $Gd_3Ga_5O_{12}$ as the magnetic material, if the magnetic material was initially at 20 K., the heat pipes transferring heat from whatever is to be cooled probably reached temperatures no lower than 5.2 K. during the demagnetization process. This probably prevented the operation of a helium heat pipe. Conversely, if the magnetic material was initially at 4.2 K., the heat pipe transferring heat away from the magnetic material probably did not exceed temperatures of 13.1 K. during the magnetization process. Thus, the hydrogen heat pipe also probably was rendered inoperative. At best, minimal heat transfer would have occurred if the heat pipes operated at all, because of the reduced temperature changes of the magnetic material.

There is, however, an existing need for an efficient refrigeration apparatus which does not depend upon flowing fluid to transfer heat energy in and out of the region where the magnetic material interacts with a cyclically timed varying magnetic field. The instant invention transmits heat through the use of heat pipes thus, eliminating elaborate seals and pumping mechanisms to transfer heat in a desired direction. Furthermore by proper arrangement of parts, the thermal addenda is minimized making it possible for the heat pipes to operate efficiently at their designed temperature.

SUMMARY OF THE INVENTION

One object of the present invention is to provide highly efficient refrigeration over a range of from about 4 to about 20 K.

Another object of the present invention is to simplify the transfer of heat to and from the magnetic material and thereby eliminate the need for elaborate pumping mechanisms and seals.

Another object of the present invention is to provide for extended periods of reliable refrigeration operation made possible by the simplicity of design for the apparatus.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise an about 4 to about 20 K. refrigeration apparatus comprising: a magnetic field generating means; a fluid contactable magnetic material interacting with the magnetic field produced by said magnetic field generating means so as to be subjected to a cyclically time varying magnetic force; a fluid effective to transfer heat at temperatures between about 4 and about 20 K.; an external heat sink; and at least two directional heat pipes, one such pipe disposed between said fluid and the object of cooling whereby heat from the object of cooling is transmitted through said fluid to said magnetic material when said magnetic material absorbs heat, and another such pipe disposed between said fluid and said external heat sink whereby heat from said magnetic material when said magnetic material is rejecting heat is transmitted through said fluid to said external heat sink, and also whereby the heat from the hot ends of said directional heat pipes is minimally transmitted to the cold ends of said directional heat pipes.

An advantage of the present invention is derived from the simplified mechanical nature of the heat pipes used to transfer heat to and from the magnetic material.

Another advantage of the present invention is the greater efficiency of refrigeration due the better insulation possible for the object of cooling and magnetic material because the leakage around seals admitting pipes for flowing fluid necessary to transfer heat in previous models has been eliminated.

Yet another advantage of the present invention is the ability to take heat away from the object of cooling at a temperature of 4 K.

Yet still another advantage of the instant invention is built in regeneration of the heat transfer medium and the magnetic material in the reciprocating embodiment.

Finally yet another advantage of the present invention is the thermal diode operation of heat pipes which minimizes undesired heat flow by conduction at certain times during the cycle and also eliminates thermal addenda associated with thermal cycling of the heat transfer mechanism since the heat pipes remain at a constant temperature.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS

Figure 1:
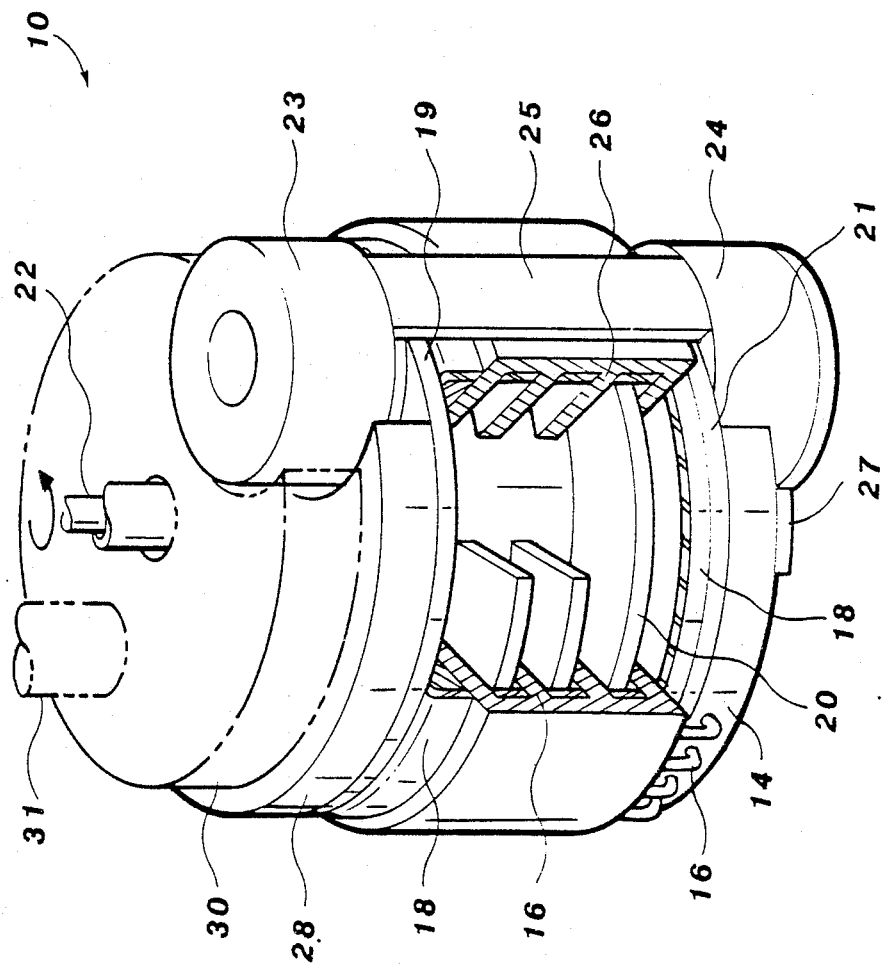
FIG. 1 is a perspective of one embodiment of the invention, the rotating wheel embodiment.

Referring now to FIG. 1, a perspective of one embodiment of invention 10 with a rotating wheel, the object of cooling attached at the bottom of the embodiment of invention 10. The view shows a perspective view with a cut-away section of the circular assembly. The object of cooling, which may be liquid helium, makes contact with a cold plate 14 and gives up heat, in this particular embodiment, by conduction. A set of heat pipes 16 conducts the heat away from cold plate 14 across the stationary housing 18 that surrounds the magnetic material 20. Within the stationary housing 18 and between the magnetic material 20 and the condensing end of the set of heat pipes 16 is a fluid adapted to transfer heat between the set of heat pipes 16 and the magnetic material 20. The magnetic material 20 in this embodiment is in the form of thin disks spaced vertically apart. The disks of magnetic material 20 are interleaved with two sets of heat pipes 16 and 26. One set of heat pipes 16 is in the cold region of operation and one set 26 is in the hot region of operation. The hot region of operation is in a high magnetic field region and the cold region of operation is in a region of low magnetic field. The disks of magnetic material 20 are joined together at a radially inward position and are further attached to a drive shaft 22. The upper disks of magnetic material 20 in FIG. 1 have been cut away to show this joint but actually are complete disks the same as depicted by the bottom disk. The drive shaft 22 rotates the magnetic material 20 from the region of close juxtaposition to the set of heat pipes 16 over to a position where the magnetic material is now in juxtaposition to magnets 23 and 24. The magnets 23 and 24, which may be superconducting magnets, surround but do not penetrate the stationary housing 18. They are separated and positioned by a brace 25. The magnets 23 and 24 are cooled by a flange 27 attached to the cold plate 14. The second set of heat pipes 26 travels from a region where one end of the second set of heat pipes 26 interleaves with the disks of magnetic material 20 to a hot plate 28. This hot plate 28 contacts heat sink 30 which transmits the heat out of the magnetic refrigerator 10 to some heat absorbing device such as suggested by pipe 31. The heat is transmitted from the heat pipes 26 to hot plate 28 by conduction. The heat moves from hot plate 28 to heat sink 30 by conduction since hot plate 28 is in intimate contact with heat sink 30. Heat sink 30 can be any type of conventional heat absorbing device such as the cold heat exchanger of another refrigerator. The hot plate 28 and the cold plate 14 are separated from the housing 18 by insulating spacers 19 and 21. Drive shaft 22 can be connected to a motor or other drive means for supplying torque to the disks of magnetic material 20.

Figure 2:
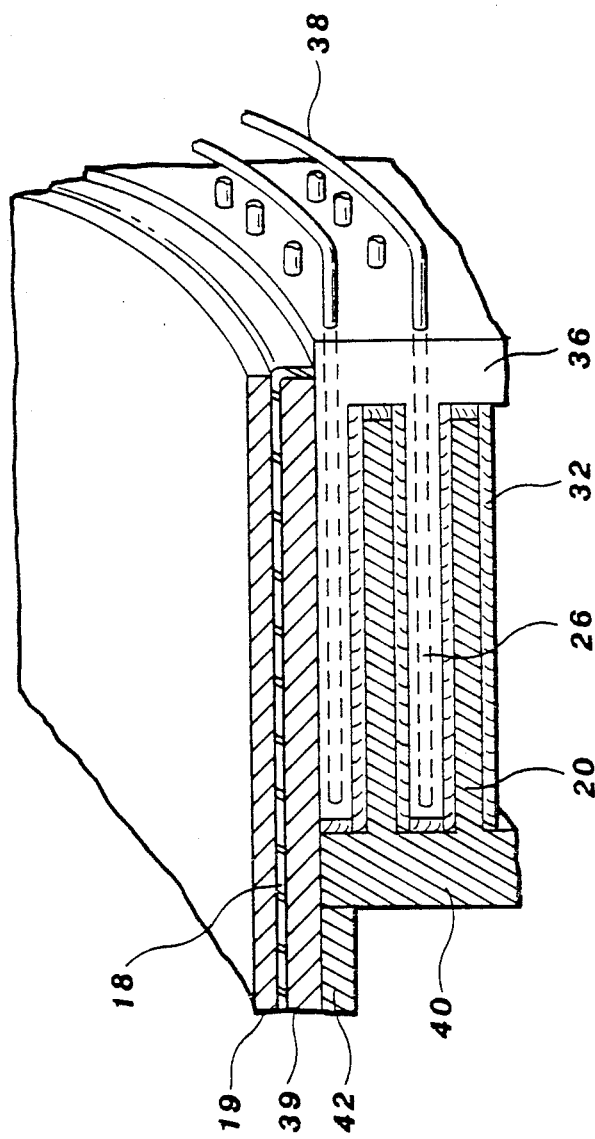
FIG. 2 is a cross-sectional perspective of the interrelationship of heat pipes and magnetic wheel material.

Referring now to FIG. 2, a cross section perspective of the interleaving of the disks of magnetic material 20 and the second set of heat pipes 26, the close tolerances between the magnetic material 20 and the evaporating end of the second set of heat pipes 26 is shown. Also illustrated are the gas flow impeders 32 that help to prevent a transfer of fluid along with the magnetic material 20 when the magnetic material 20 moves from region to region within the refrigeration apparatus 10. Generally the gas flow impeders 32 are in the shape of flexible wipers acting like a doctor blade. The second set of heat pipes 26 is shown within the heat pipe block 36 when the heat pipes are disposed in a horizontal direction. However, at the point where the heat pipes 26 make a 90° turn to the horizontal orientation, the heat pipe block 36 ends. This block is also hermetic with the housing 18. Individual heat pipes 38 transport the heat horizontally and then vertically to the hot plate 28 (not shown). While all individual heat pipes 38 travel horizontally then vertically, for illustration purposes, FIG. 2 shows the horizontal travel of only two such individual heat pipes 38 while the rest are cut off before the first 90° turn. The heat pipe must not touch the brace 25 of the magnets 23 and 24. The insulating spacer 19 is shown above housing 18. The disks of magnetic material 20 are joined at a radially inward position to provide for vertical spacing. The radially inward joint 40 is itself attached to a connecting means 42 that transmits torque from drive shaft 22 to the disks of magnetic material 20 through radially inward joint 40. The connecting means 42 and radially inward joint 40 may themselves be made of magnetic material and integral with the disks of magnetic material 20. The connecting means 42 may be a set of spokes of diffferent material which attach at selected points to the radially inward joint 40. The partition 39 is used to restrict the motion of the heat transfer fluid during operation of the refrigerator 10.

Figure 3:
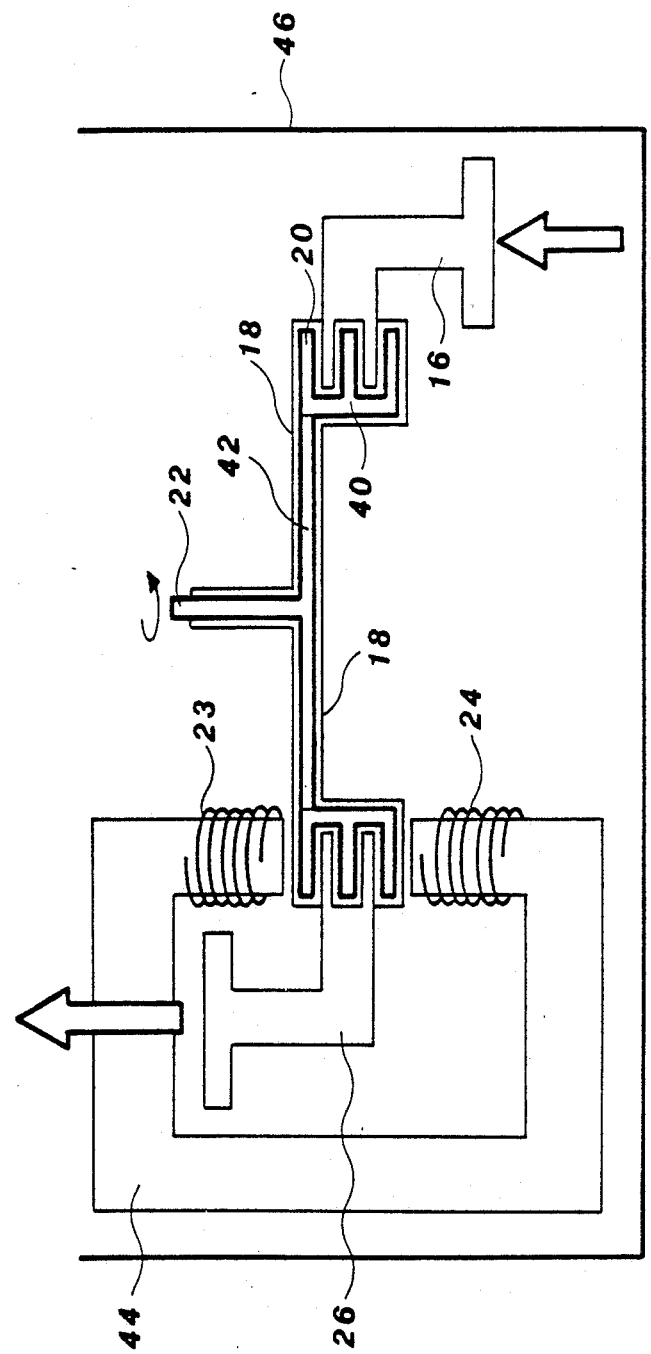
FIG. 3 is a partially schematic cross-sectional view of the embodiment of FIG. 1.

Referring now to FIG. 3, a partially schematic drawing of the embodiment of the invention shown in FIGS. 1 and 2 wherein the angle between the set of hot heat pipes 26 and the set of cold heat pipes 16 has been changed to 180° for illustration purposes, the structure of the disks of magnetic material 20 can now be seen better. Surrounding the drive shaft 22, the connecting means 42, the radially inward joint 40, and the disks of magnetic material 20 is stationary housing 18 which provides confinement for heat transfer fluid. This stationary housing 18 can be made from a sheet of stainless steel. The set of heat pipes 16 and the second set of heat pipes 26 are shown interleaving with the disks of magnetic material 20. The point of attachment for the sets of heat pipes 16 and 26 are represented by the arrows which show energy flow into heat sink 30 and out of object of cooling (neither shown). Additionally, the magnets 23 and 24, which can be superconducting magnets, are represented by a wire wound around a flux return circuit 44 which can be composed of soft iron. The fact that the arrow showing energy flow out of the heat pipes 26 crosses the flux return circuit 44 does not mean that the energy will flow across the circuit 44 in actual operation but only means that the energy flows out of the magnetic refrigerator. The refrigerator 10 is often surrounded by an insulating wall 46. This can be a Dewar container, preferably with super insulation to reduce heat leaks into the refrigerator 10. In the preferred version of this embodiment of the invention 10, partially diagramed in FIGS. 1–3, two sets of magnets with two sets of heat pipes are aproximately 180° of rotation apart and two sets of heat pipes approximately 180° apart attached to the cold plate 14 are approximately 90° from the magnets.

Figure 4:
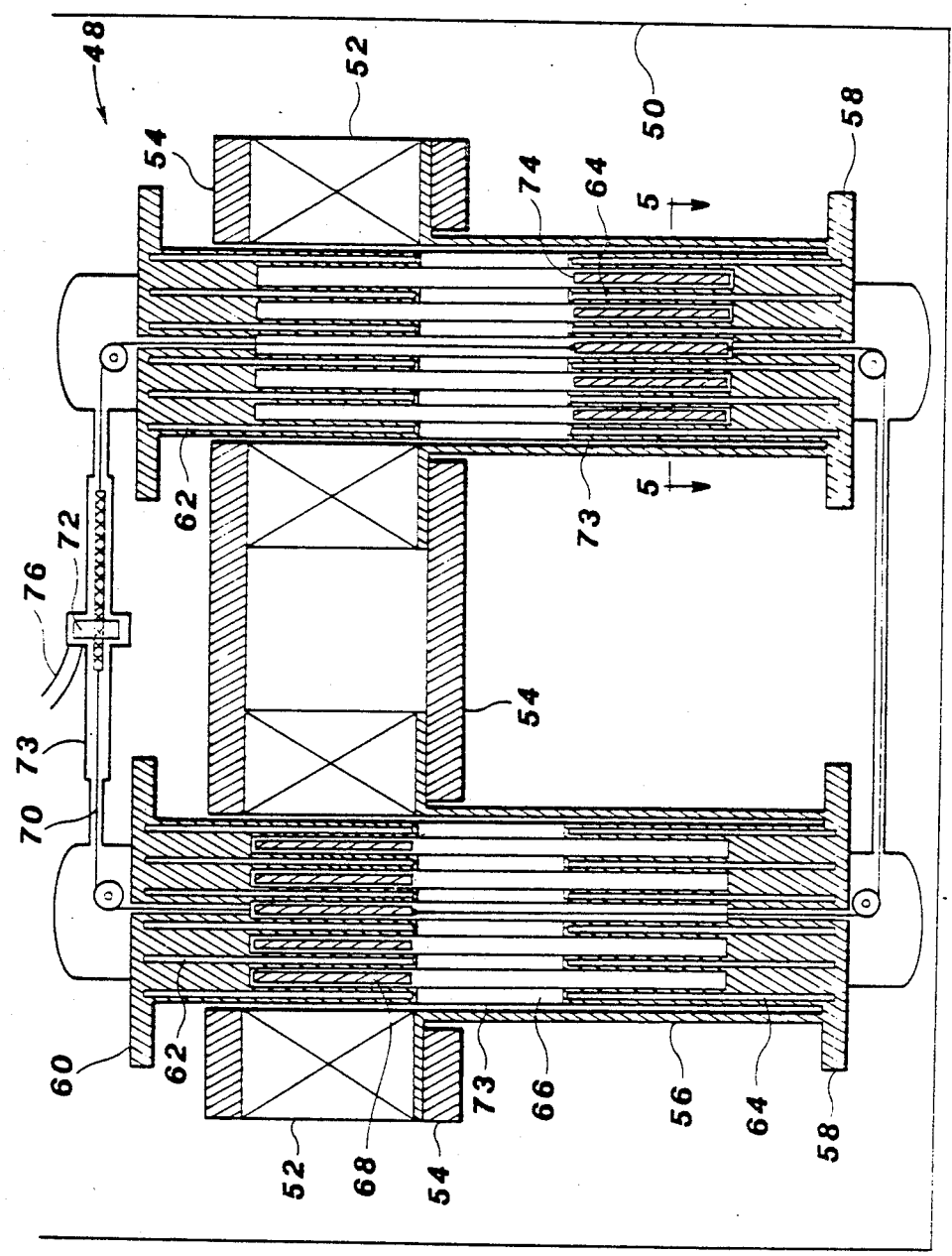
FIG. 4 is a cross-sectional view of another embodiment of the invention, the embodiment where a reciprocating mass of magnetic materials travels in the spaces between heat pipes in tubular envelopes.

Referring now to FIG. 4, which is a cross-sectional view of the reciprocating mass embodiment of the invention 48, an insulating wall 50 surrounds the refrigeration apparatus. The superconducting magnets 52 can operate in persistent mode and may be made of NbTi or $Nb_3Sn$ wire. A flux return circuit 54, typically made of soft iron, connects the superconducting magnets 52. However, the flux return circuit 54 is separated from the bottom of the superconducting magnets 52 by an extension ring stand of the 4 K. end of the cylinder 56. This cylinder 56 ends in a bottom flange 58 that is attached to an object of cooling (not shown). Heat is rejected through a top flange 60 which is attached to a heat sink (again not shown). Within the housing 73 are disposed the hot end heat pipes set 62 and the cold end heat pipes set 64 which are physically attached to each other by an insulating separator 66. This assembly of heat pipes sets and insulator makes up a structure extending most of the length of the housing 73. Also disposed within housing 73 is a reciprocating mass 68 which travels between the cold end heat pipes set 64 and the hot end heat pipes set 62. The reciprocating mass 68 is made of magnetic material. A shuttle drive wire 70 is attached to the reciprocating mass 68 and is itself moved by a linear motor 72. As shown in FIG. 4, a second reciprocating mass 74 can balance the motion of the reciprocating mass 68. The shuttle drive wire 70 is attached to both the top and bottoms of both reciprocating masses 68 and 74. The linear motor 72 that moves the shuttle drive wire 70 can be an indirectly coupled means to impart motion. The linear motor can also be put inside the housing 73 as shown and only hermetic power leads brought into the housing 73. The power leads 76 to the linear motor 72 are shown at the top of FIG. 4. Other methods of indirect coupling are available such as a magnetic drive. Also, it is possible to use a direct coupling drive means such as a cable and drum arrangement to impart motion to the shuttle drive wire 70.

Figure 5:
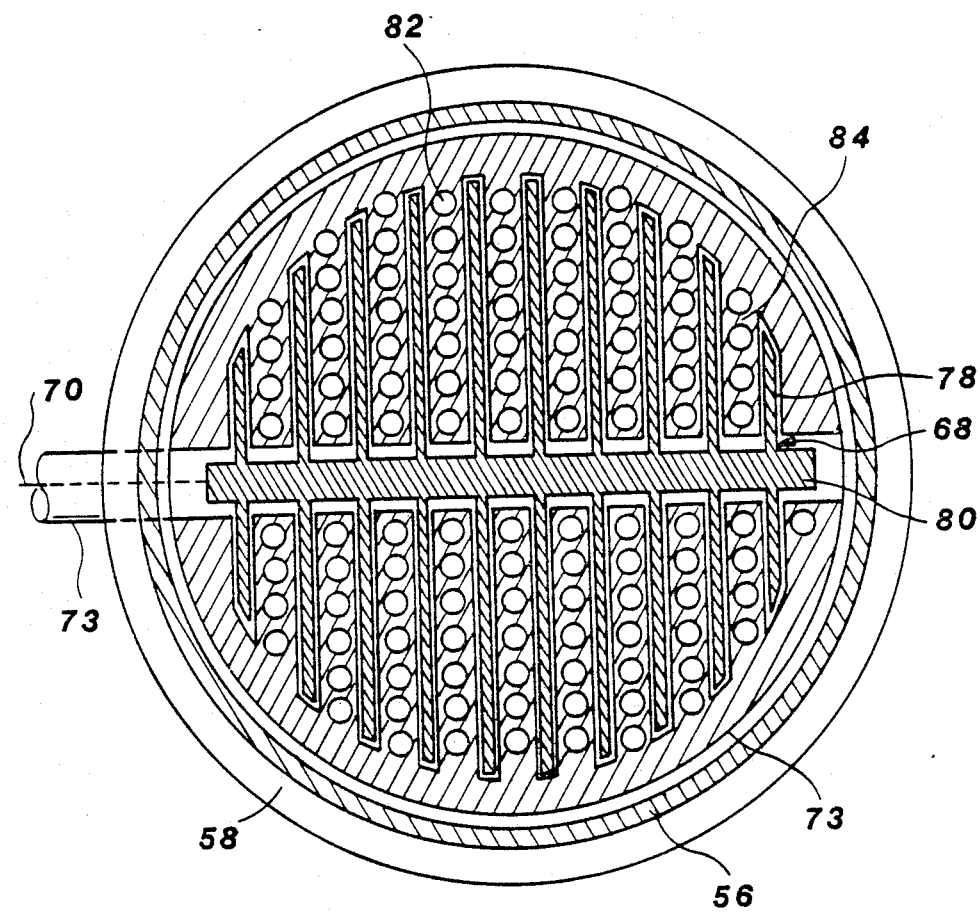
FIG. 5 is a horizontal cross section of one side of the embodiment of FIG. 4.

Referring now to FIG. 5, a horizontal cross section of the cold-end heat pipe set 64, the close tolerances between the reciprocating mass 68 and the tubular envelopes of the cold end heat pipes set 64 can be seen. Such close tolerances are also maintained between the reciprocating mass 68 when it passes by the insulating separator 66 and the hot end heat pipes set 62. The reciprocating mass 68 can be seen to be an assembly of magnetic material plates 78 which are joined together at the center of the housing 73 by a shuttle 80. The shuttle drive wire 70 is attached to the shuttle 80 (attachment point not shown). The shuttle 80 may be itself a continuation of the magnetic material plates 78 or it may be a different material such as a titanium alloy which serves to attach the plates of magnetic material 78 together along a diameter of the housing 73. An individual heat pipe 82 is shown in FIG. 5 to show the arrangement of such individual heat pipes 82 that go to make up either the hot end heat pipes set 62 or cold end heat pipes set 64. Because FIG. 5 is a cross section viewed from above of the right hand cylinder of FIG. 4, the cylinder 56 and the bottom flange 58 are seen. A horizontal section of the housing 73 and shuttle drive wire 70 are also shown.

Between the individual heat pipes 82 is a block 84 which can be copper. This block 84 is in intimate contact with helium gas that fills the gap between the magnetic material 78 and the block 84.

Returning now to the embodiment of the invention incorporating rotating disks of magnetic material 20, the magnetic material during a complete rotation will pass through at least one magnetic field generated by the magnets 23 and 24 at which time it also comes in close proximity to the second set of heat pipes 26. Continuing the rotation the magnetic material 20 exits the region of strongest magnetism created by the magnets 23 and 24 and enters the region of the set of heat pipes 16. While the magnetic material 20 is within the zone of strongest magnetic force generated by magnets 23 and 24, the magnet material 20 rejects heat. This heat is transmitted by the heat transfer fluid, which can be helium gas, to the heat pipe block 36 and then by conduction to the second set of heat pipes 26. The second set of heat pipes 26 are often filled with hydrogen in a two phase mixture. An important thing to note is that the heat pipes stay at the same temperature reducing the thermal addenda attached to the moving magnetic material within the device. The heat pipes also act as thermal diodes isolating the magnetic material 20 from the hot plate 28 during demagnetization and from the cold plate 14 during magnetization. This minimizes undesired heat flow by conduction at certain times during the cycle. When the heat pipes are referred to as directional it is to be understood that directional means this diode effect not that the heat pipes are gravity-assisted.

Simultaneous with the transfer of heat from the magnetic material 20 to the second set of heat pipes 26, in a different region of the circular disk of magnetic material 20, heat is being transferred from the object of cooling to the magnetic material 20 when the magnetic material 20 is under the minimal influence of a magnetic field. This again is accomplished by a set of heat pipes 16 which can be filled with helium 2-phase mixture. The heat from the lower end of the set of heat pipes 16 is transferred via the heat pipe to a heat pipe block (similar to the heat pipe block 36) that interleaves the disks of magnetic material 20. Heat is transferred from the heat pipe block through heat transfer fluid to the magnetic material 20. The magnetic material 20 with the heat imparted from the set of heat pipes 16 then rotates into the region interleaved with second set of heat pipes 26.

Heat pipes operate basically by evaporating fluid at their hot ends when heat is transferred into the heat pipe. The working fluid then moves to the cold end of the heat pipe where it is condensed when heat leaves the heat pipes. The condensed working fluid returns to the hot end of the heat pipe either by gravity or capillarity.

Figure 6:
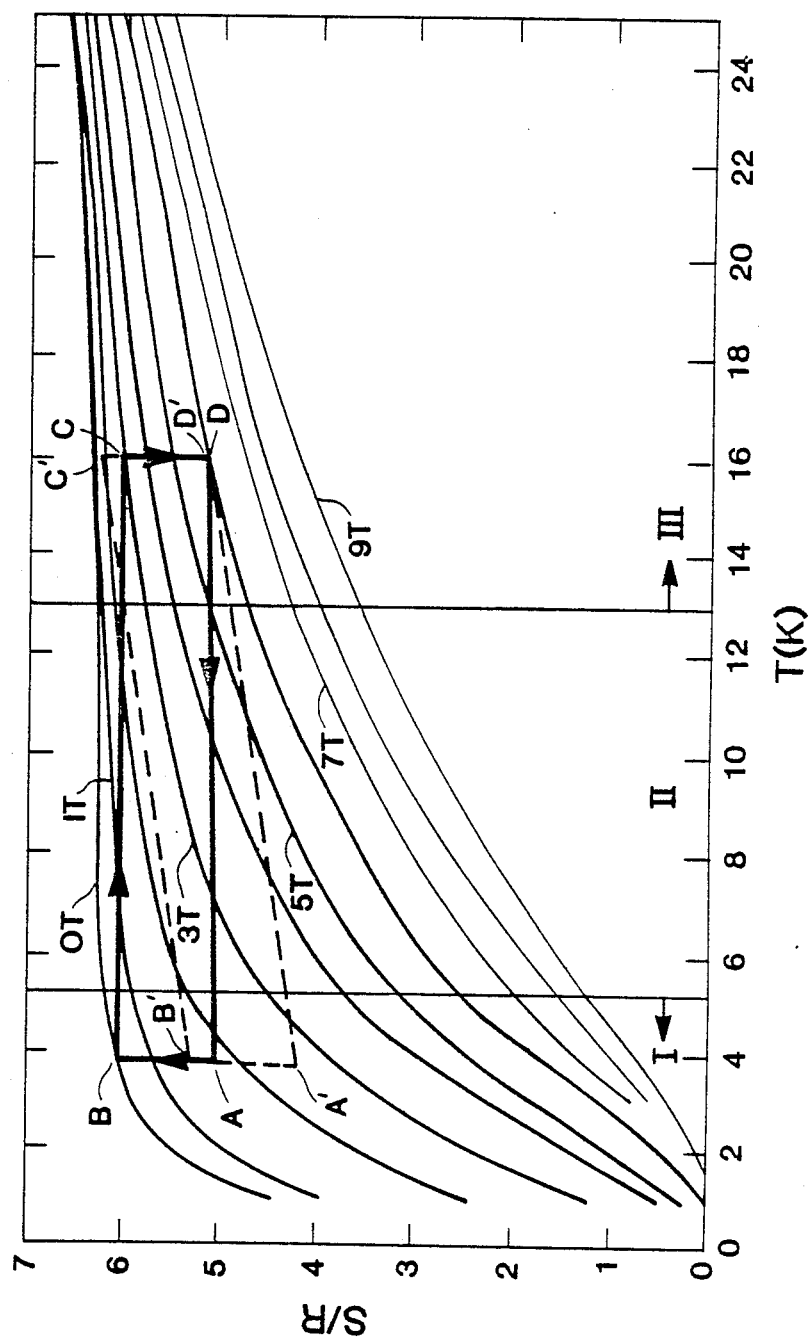
FIG. 6 graphically depicts the operating cycles of the invention of an entropy-temperature (S/R-T) diagram.

Referring now to FIG. 6, an idealized entropy-temperature curve for the operation of a magnetic refrigerator wherein the magnetic material is $Gd_3Ga_5O_{12}$, a zone of operation is shown in lines ABCD at top of the graph. The solid curves going from the lower left to the upper right show the relationship between entropy and temperature at varying magnetic fields. The field strength is expressed in Tesla. FIG. 6 is also divided into 3 vertical sections I, II, and III. The left most section I represents temperatures below 5.2 K., the critical temperature of helium, below which the helium heat pipes transfer heat. The right most section III represents temperatures above 13.1 K., the triple point temperature of hydrogen, above which the hydrogen heat pipes transfer heat. With the embodiment shown in FIGS. 1, 2, and 3, starting at point A, the magnetic material 20 enters the region of the first set of heat pipes 16. When magnetic material 20 travels through the region of the first set of heat pipes 16 it is absorbing heat from the object of cooling and graphically moves to point B. The magnetic material 20 then moves from the region of the set of heat pipes 16 into the region of a second set of heat pipes 26 and magnets 23 and 24 that generates the magnetic field. Entry of the magnetic material 20 into such a magnetic field causes a rapid rise in temperature to about 16 K. as is graphically depicted by the line BC. The magnetic material then proceeds to give up heat to the second set of heat pipes 26 when traveling further through the region of strongest magnetic field. Also at this time an isothermal magnetization at about 16 K. corresponds to the movement of the magnetic material from point C to point D on FIG. 6. The magnetic material 20 then enters the region of lowest magnetic field and falls in temperature to about 4.2 K. corresponding to point A in FIG. 6. Real effects such as thermal addenda and finite heat transfer will cause the outline ABCD to deviate slightly from a rectangular shape. The operating cold and hot temperatures are variable according to design of the magnetic material, the strength of the magnetic field, the position of the hot and cold heat pipe section, the object of cooling temperature, and the heat sink temperature. In FIG. 6, region I indicates the range of object of cooling temperatures that can be accessed; region III indicates the region of heat sink temperatures that can be accessed, and region II indicates the region of temperatures where neither heat pipe can operate.

Referring again to the embodiment of the invention shown in FIGS. 4 and 5, the reciprocating mass embodiment, the balanced nature of the operation becomes clear. The reciprocating mass 68 on the left side of FIG. 4 is shown to be in the region adjacent to the magnet 52. In this region, the magnetic material 78 in the reciprocating mass 68 has undergone magnetization and is transferring heat to the hot end heat pipes set 62 through helium gas and heat pipe block 84. While in this position, the cold end heat pipes set 64 is inactive and thermally isolates the heat load from the refrigerator 48 because the temperature gradient is unfavorable to heat transfer in this lower region. When the reciprocating mass 68 starts to descend toward the cold end heat pipes set 64, a volume of helium gas equal to the reciprocating mass 68 is forced to move in the opposite way, i.e., up. The magnetic material 78 in the reciprocating mass 68, because it is leaving the magnetic field generated by the magnet 52, starts to cool. While the helium gas is moving past the cooling magnetic material 78 in the reciprocating mass 68, the helium gas is heated and the reciprocating mass 68 is further cooled. This prevents a thermal short circuit because if the helium gas was not heated from the heat given up by reciprocating mass 68, the cold helium gas would cool the hot end heat pipes set 62 and reduce the amount of heat rejected into heat sink 60.

The periodic exchange of energy between the helium gas and the magnetic material as they pass by each other is known as thermal regeneration. Referring to FIG. 6, the dashed lines defining parallelogram A'B'C'D' show an idealized cycle with regeneration.

Meanwhile on the right side of FIG. 4, the reciprocating mass 74 is moving from the cold end heat pipes set 64 up into the magnetic field generated by the magnet 52. Back again on the left side of the magnetic refrigeration apparatus 48, when the reciprocating mass 68 descends into the cold end heat pipes set 64, the heat from the object of cooling (not shown in FIG. 4) is transmitted by the cold end heat pipes set 64 through the heat pipe block 84 to the helium gas and eventually to the magnetic material 78 of the reciprocating mass 68.

Referring once again to FIG. 6, point B' represents the reciprocating mass 68 at the lower extent of travel in the region of cold end heat pipes set 64. Process B'C'D' represents the time when reciprocating mass 68 is moving from the region of cold end heat pipes set 64 to the region of hot end heat pipes set 62. Point D' represents reciprocating mass 68 at the highest extent of travel in the region of hot heat pipes set 62. Process D'A'B' on FIG. 6 represents the time when reciprocating mass 68 is moving from hot end to cold end. The heat transfer operations are the same as in the rotating wheel embodiment operation described for FIG. 6 except that regeneration causes the rectangle ABCD to be displaced into the parallelogram A'B'C'D' as shown by the dashed lines.

The heat pipes shown in FIG. 4 and FIG. 5 can be numerous bore holes drilled into rectangular plates of copper. Copper is chosen for its high thermal conductivity. The insulation section 66 can be made from stainless steel plates or other good thermal insulating materials to provide good thermal insulation between the two regions of copper plates.

The magnets 52 when they are superconducting magnets can be made from NbTi wire if the refrigerator is operating at about 4 K. Another possible material for the wire in superconducting magnets can be Nb$_3$Sn. This wire has a critical temperature of about 18 K. in zero magnetic field. The current capacity of the wire increases as the temperature drops and magnets of this wire can be operated below about 18 K. Permanent magnets made of SmCo$_5$ and Nd$_2$Fe$_{14}$B can also be used.

While the two embodiments of the invention shown in the FIGS. 1–5 depended upon the movement of the magnetic material through regions of varying magnetic field, other methods of varying the interaction of magnetic field and magnetic material can be used. For instance, the magnet can be moved closer to and then further away from the magnetic material. Also, the magnitude of the magnetic field may be varied at any one position by supplying varying power to an electromagnet. A magnetic shield may be cyclically interposed between the magnet and the magnetic material. Finally a crystal with an anisotropic magnetic moment can serve as the magnetic material and its interaction with the magnetic field can be varied by aligning it with and then turning it out of alignment with the magnetic field.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. An about 4 to about 20 K. refrigeration apparatus comprising:
   a magnetic field generating means;
   a fluid contactable magnetic material interacting with the magnetic field produced by said magnetic field generating means so as to be subjected to a cyclically time varying magnetic field;
   a fluid effective to transfer heat at temperatures between about 4 and about 20 K.;
   an external heat sink; and
   at least two directional heat pipes, one such pipe disposed between said fluid and the object of cooling whereby heat from the object of cooling is transmitted through said fluid to said magnetic material when said magnetic material absorbs heat, and another such pipe disposed between said fluid and said external heat sink whereby heat from said magnetic material when said magnetic material is rejecting heat is transmitted through said fluid to said external heat sink, and also whereby the heat from the hot ends of said directional heat pipes is minimally transmitted to the cold ends of said directional heat pipes.

2. The refrigeration apparatus of claim 1 wherein said magnetic field generating means is moved by a drive means in a cyclic manner to vary the position of the magnetic field in relation to said magnetic material.

3. The refrigeration apparatus of claim 1 wherein said magnetic material is moved by a drive means in a cyclic manner to vary the position of said magnetic material in relation to the magnetic field.

4. The refrigeration apparatus of claim 1 wherein said magnetic field is varied in strength through time.

5. The refrigeration apparatus of claim 1 wherein said magnetic field generating means is a superconducting magnet.

6. The refrigeration apparatus of claim 5 wherein said superconducting magnets are made with $Nb_3Sn$ and are maintained at superconducting temperatures by the cooling of said refrigeration apparatus.

7. The refrigeration apparatus of claim 1 wherein said magnetic field generating means is a permanent magnet.

8. The refrigeration apparatus of claim 1 wherein said magnetic material is in the form of a rotating wheel.

9. The refrigeration apparatus of claim 8 wherein said fluid and said magnetic material is contained in a hermetically sealed container.

10. The refrigeration apparatus of claim 8 wherein said heat pipes are disposed both above and below said rotating wheel.

11. The refrigeration apparatus of claim 8 wherein said rotating wheel is segmented into disks sufficiently spaced apart to allow said ends of the directional heat pipes to interleave, but not contact, the disks of magnetic material.

12. The refrigeration apparatus of claim 11 wherein a set of directional heat pipes is interleaved with more than two disks of magnetic material.

13. The refrigeration apparatus of claim 11 wherein said disks of magnetic material are spaced apart vertically but are joined together at a radially inward position.

14. The refrigeration apparatus of claim 11 wherein said disks are disposed vertically and are spaced apart horizontally, but are joined together at the face opposite from the direction of entry of said heat pipes.

15. The refrigeration apparatus of claim 1 wherein said directional heat pipes are disposed in tubular envelopes which are composed of a high thermal conductivity material.

16. The refrigeration apparatus of claim 15 wherein said magnetic material is disposed in a reciprocating mass that surrounds but does not touch said tubular envelopes.

17. The refrigeration apparatus of claim 16 wherein thermal regeneration is achieved between said magnetic material and said fluid.

18. The refrigeration apparatus of claim 15 wherein said fluid and said magnetic material are contained in a hermetically sealed container.

19. The refrigeration apparatus of claim 18 wherein said magnetic material is moved by a cable which is driven by a indirect coupler.

20. The refrigeration apparatus of claim 19 wherein said indirect coupler is a magnetic coupler.

21. The refrigeration apparatus of claim 1 wherein said fluid is gaseous helium.

22. The refrigeration apparatus of claim 1 wherein said directional heat pipe disposed between said fluid and the object of cooling contains helium and said another such heat pipe disposed between said fluid and said external heat sink contains hydrogen.

23. The refrigeration apparatus of claim 1 wherein a set of heat pipes is disposed between said fluid and the object of cooling and another set of heat pipes is disposed between said fluid and said external heat sink.

* * * * *